United States Patent [19]
Runkel

[11] Patent Number: 5,547,211
[45] Date of Patent: Aug. 20, 1996

[54] HYDROPNEUMATIC SUSPENSION SYSTEM WITH STABILIZATION

[75] Inventor: Walter L. Runkel, Wuppertal, Germany

[73] Assignee: Hemscheidt Fahrwerktechnik GmbH & Co., Wuppertal, Germany

[21] Appl. No.: 322,586

[22] Filed: Oct. 13, 1994

[30] Foreign Application Priority Data

Apr. 29, 1994 [DE] Germany .......................... 94 07 167.5

[51] Int. Cl.⁶ .................................................. B60G 11/26
[52] U.S. Cl. .......................... 280/708; 280/702; 280/714; 267/64.15
[58] Field of Search ..................... 280/708, 702, 280/714, 713, DIG. 1, 688, 840, 6.11, 6.12; 267/64.15, 64.16, 64.25

[56] References Cited

U.S. PATENT DOCUMENTS

| | | | |
|---|---|---|---|
| 4,377,299 | 3/1983 | Fujii | 280/708 |
| 5,046,755 | 9/1991 | Runkel et al. | 280/708 |
| 5,141,244 | 8/1992 | Clotault et al. | 180/714 X |
| 5,246,247 | 9/1993 | Runkel | 280/208 |
| 5,271,632 | 12/1993 | Glaser et al. | 280/6.12 |
| 5,344,124 | 9/1994 | Runkel | 267/64.15 |

FOREIGN PATENT DOCUMENTS

| | | | |
|---|---|---|---|
| 4003200 | 8/1991 | Germany | 280/708 |
| 0213510 | 10/1985 | Japan | 280/708 |

*Primary Examiner*—Christopher P. Ellis
*Attorney, Agent, or Firm*—Jones & Askew

[57] ABSTRACT

A hydropneumatic vehicle suspension system has two strut assemblies with hydraulic struts that act upon at least one hydropneumatic piston-type accumulator. The accumulator has a separating piston charged with hydraulic pressure on one side of a storage volume, pneumatic pressure on the other side of a spring chamber and a supplementary spring force via a separating piston rod that extends out of the piston-type accumulator. The supplementary spring force is generated by a pressure medium cylinder that acts upon the separating piston rod by connecting the pressure medium cylinder with at least one pressure accumulator that generates a prestress pressure.

14 Claims, 4 Drawing Sheets

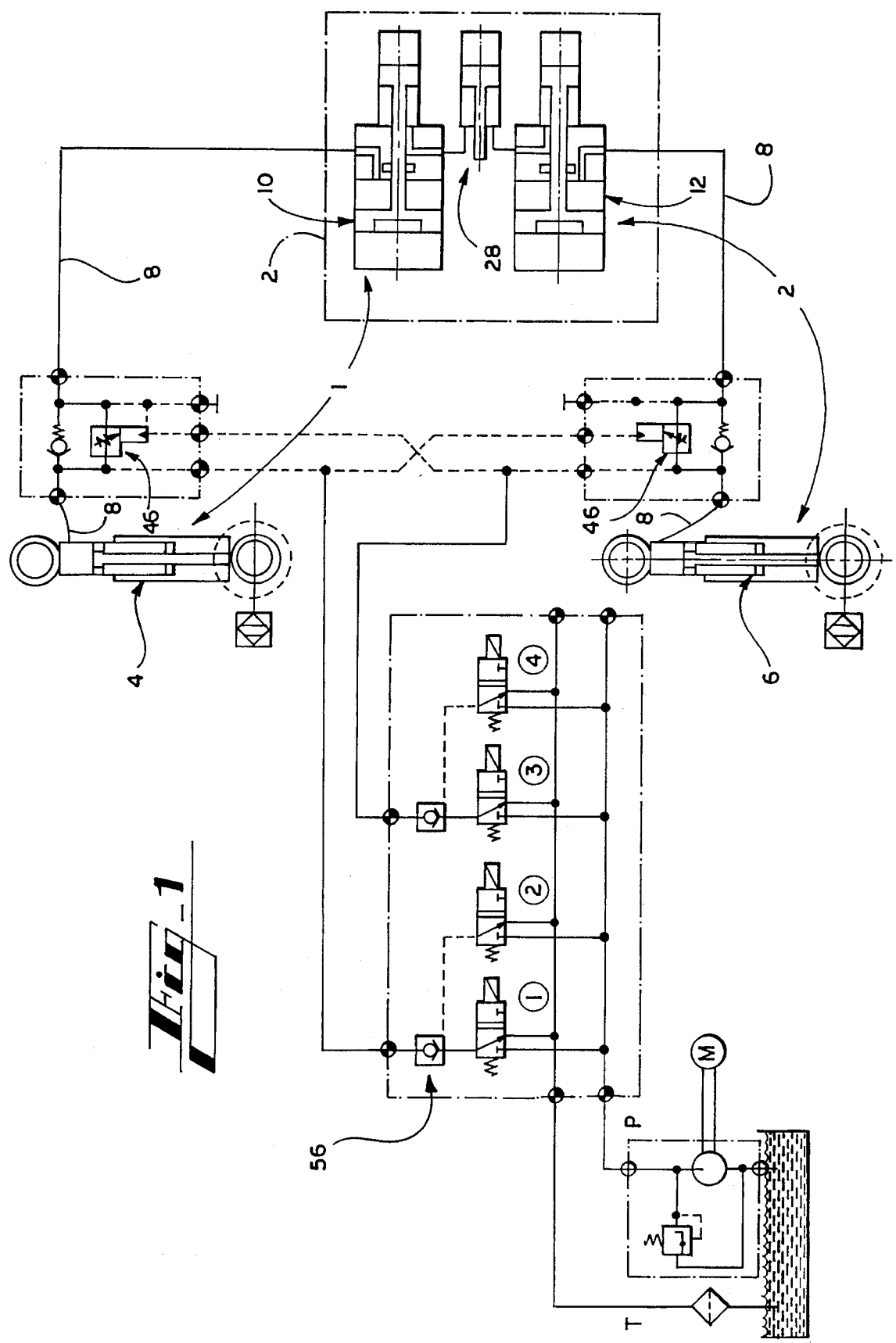
Fig_1

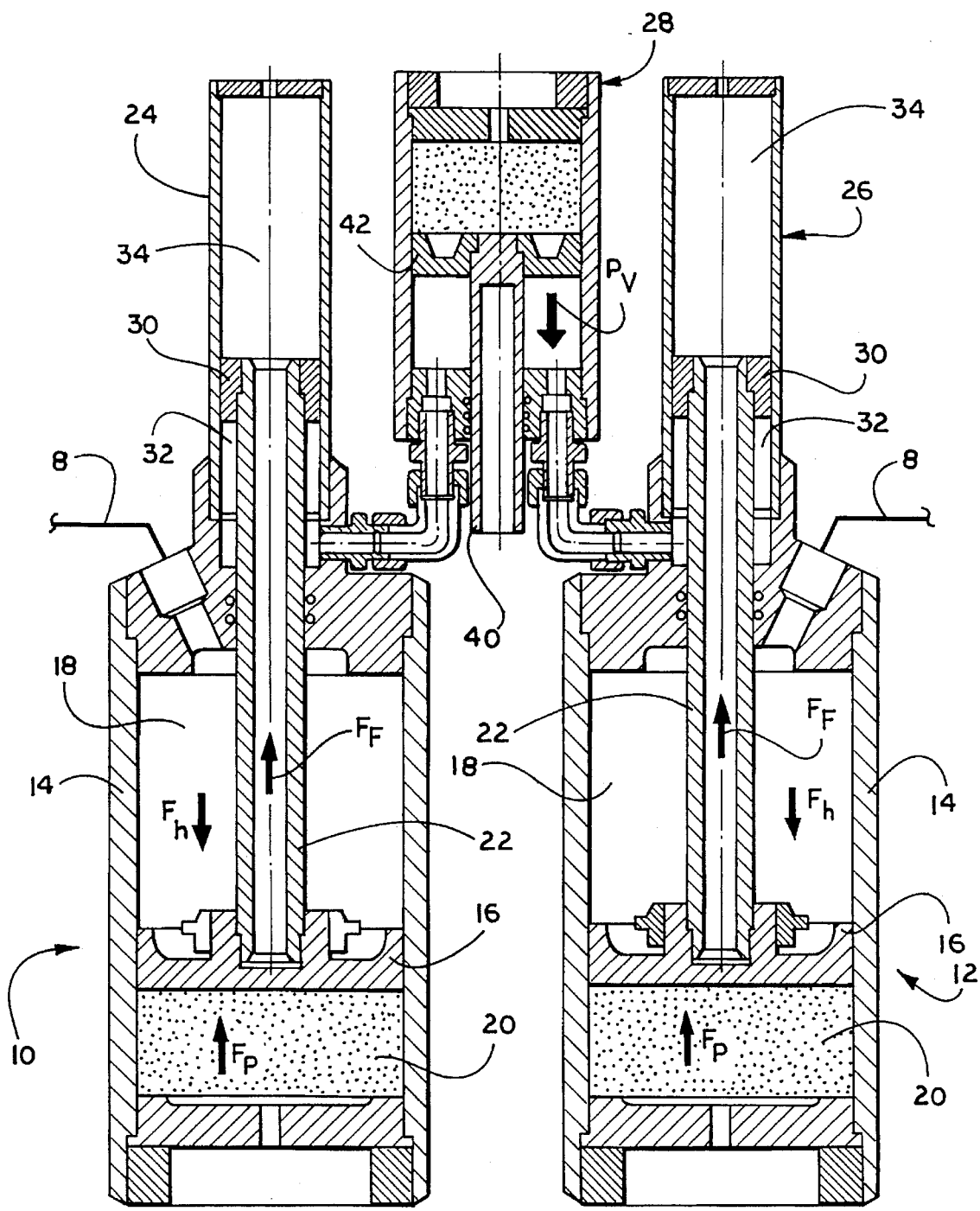
Fig_2

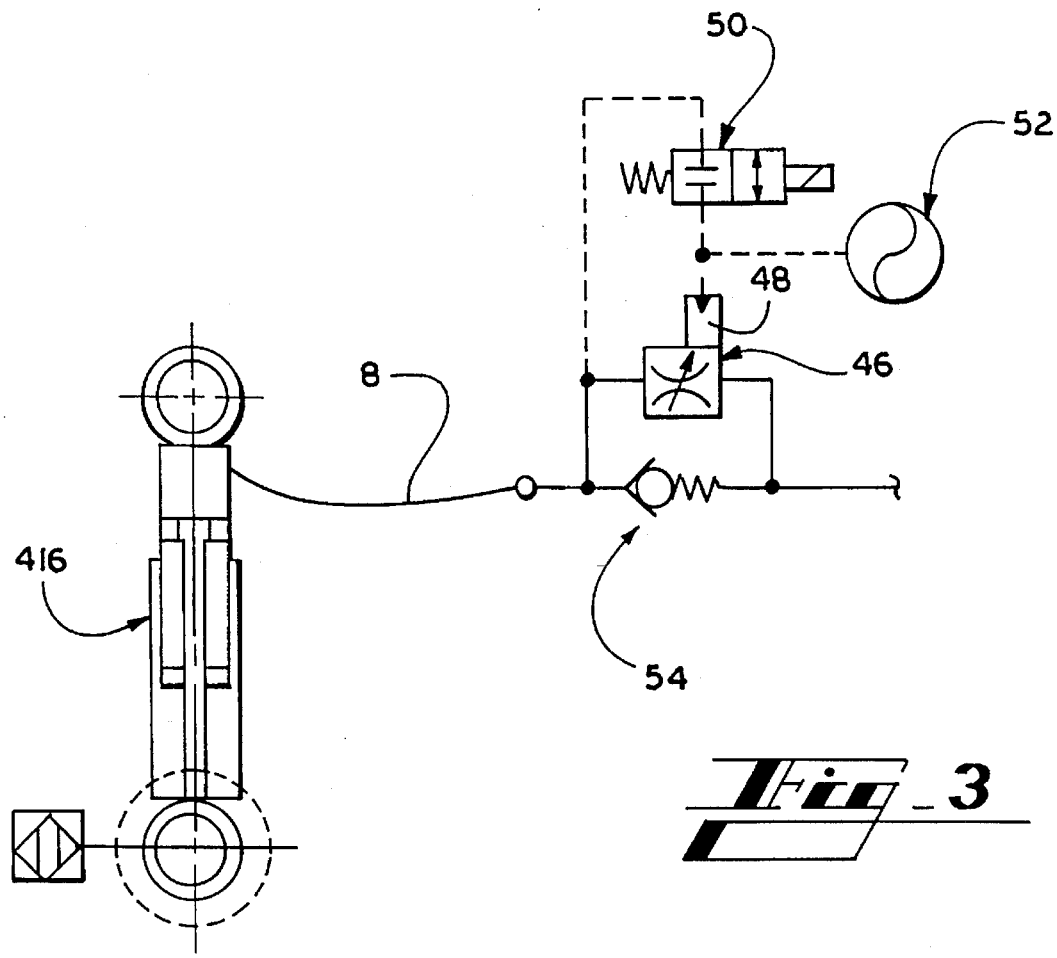
Fig_3
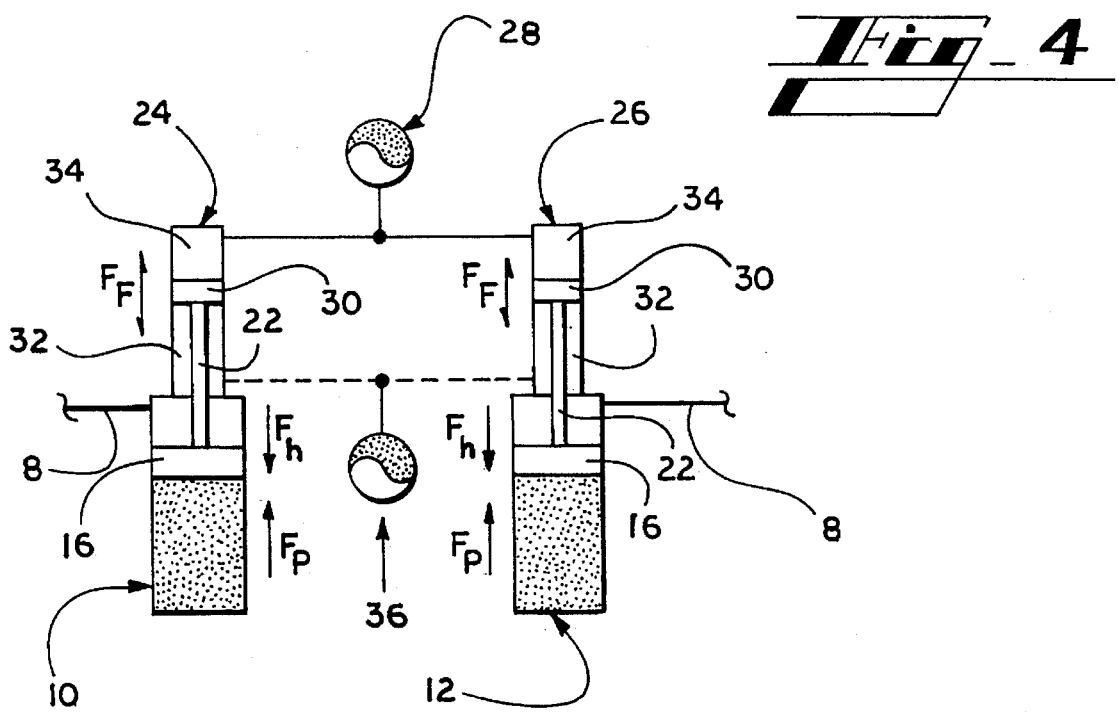
Fig_4

HYDROPNEUMATIC SUSPENSION SYSTEM WITH STABILIZATION

FIELD OF THE INVENTION

The present invention pertains to a hydropneumatic suspension system, particularly for motor vehicles, comprising at least one strut system with a hydraulic strut that during its deflection and rebound movement, acts upon at least one hydropneumatic piston-type accumulator via a hydraulic medium, whereby the piston-type accumulator is provided with a separating piston, which has a separating piston rod that extends out of the piston-type accumulator and separates a hydraulic storage volume from a spring chamber containing a compressible medium, particularly a gas, and whereby the separating piston is charged with hydraulic pressure on the side of the storage volume, a pneumatic pressure on the side of the spring chamber and, in addition to the forces resulting thereof, with a supplementary spring force via the separating piston rod, whereby the supplementary spring force is generated by a pressure medium cylinder that acts upon the separating piston rod by connecting the pressure medium cylinder with at least one pressure accumulator that generates a prestress pressure.

BACKGROUND OF THE INVENTION

A suspension system of this type is described in German Pat. No. 4,234,217 A1. In this suspension system, very good suspension characteristics are realized due to the fact that the supplementary spring force influences the volume of the compressible medium inside of the piston-type accumulator, in addition to the normal volume changes caused by the load and the deflection and rebound movement, in such a way that a load ratio (or a compression and pressure ratio that deviates from the normal ratios that are present without a supplementary spring force), which differs from the load ratio of the strut, adjusts itself inside the piston-type accumulator. This altered accumulator load ratio is substantially smaller as compared to the load ratio of the strut. This measure allows the pressure accumulator to be constructed in a smaller and more compact fashion as well as with a shorter stroke of the separating piston. The supplementary spring force, in general, may be generated by means of arbitrary spring elements, but one of the known embodiments utilizes a pressure medium cylinder that acts upon the separating piston via the separating piston rod, whereby the pressure medium cylinder is connected with at least one pressure accumulator that generates a prestress pressure. This measure allows the desired variability of the supplementary spring force in a relatively simple fashion.

SUMMARY OF THE INVENTION

The present invention is based on the objective to develop this known suspension system in such a way that, in addition to the very good suspension characteristics, the performance of the motor vehicle, e.g., while braking and driving through curves, is improved without causing a substantial cost increase.

According to the invention, this objective is attained by the fact that at least two respective strut systems are interconnected in a motor vehicle by connecting the existing pressure medium cylinders, which charge one respective piston-type accumulator or their separating piston with the supplementary spring force with one another and with at least one collective pressure accumulator.

This measure according to the invention advantageously allows a very effective stabilization of a motor vehicle equipped with the system according to the invention, in particular, due to the fact that the natural frequency is influenced favorably, primarily in the static condition. The invention even allows a cost reduction because only one pressure accumulator is provided instead of two pressure accumulators. In this, it is particularly practical to arrange the struts of two interconnected strut systems according to the invention on opposite sides of the motor vehicle (left and right), in particular on the same axle. In addition, it is preferred to charge the pressure medium cylinders, which, in turn, charge the separating piston via the collective pressure accumulator in such a way that the supplementary spring force of each separating piston acts in the direction of the force resulting from the pneumatic pressure of the piston-type accumulator (in the sense of a forced expansion of the compressible medium). Consequently, each pressure medium cylinder and the collective pressure accumulator form a tension spring for generating the supplementary spring force. In this preferred embodiment, the hydraulic medium is either displaced from both piston-type accumulators into the collective pressure accumulator during the spring deflection or returned from the pressure accumulator into the two piston-type accumulators during the rebound if a parallel spring travel occurs (largely identical spring deflection and expansion of both struts, e.g., while braking or driving over speed bumps). However, if spring travel only occurs on individual wheels (e.g., when driving over bumps situated on only one side of the motor vehicle), only a small hydraulic volume travels back and forth between one of the two piston-type accumulators and the pressure accumulator, so that fewer pressure changes occur than during parallel spring travel. Consequently, the stiffness of the spring during a parallel spring travel is higher than during an individual spring travel. This leads to the fact that, for example, while driving over a manhole cover or the like (individual wheel travel), no excessive jolts are transmitted to the motor vehicle. However, when braking the motor vehicle (parallel spring travel), the front of the motor vehicle is no longer lowered as far as it was in the case with conventional suspension. One additional advantage can be seen in that the motor vehicle tilts only relatively slightly toward the side when driving over taller obstacles with one wheel and the other side situated opposite the obstacle is slightly raised. This effect is realized by the fact that the strut on one wheel is compressed intensely such that the separating piston of the corresponding piston-type accumulator is moved in the direction of the spring chamber (compression). In the preferred embodiment, this means that the hydraulic medium is displaced into the pressure accumulator. Due to the interconnection according to the invention, the thusly increased prestress pressure acts upon the separating piston of the other piston-type accumulator situated on the opposite side such that the compressible medium is expanded on this side and the hydraulic medium is displaced from the piston-type accumulator into the strut. This causes the opposite strut to slightly raise the motor vehicle.

An alternative embodiment suggests that the collective pressure accumulator charges both pressure medium cylinders with the prestress pressure in such a way that the supplementary spring force of each separating piston acts in the direction of the force resulting from the hydraulic pressure. In this embodiment, each pressure medium cylinder and the pressure accumulator form a pressure spring for generating the supplementary spring force. In this embodiment, the hydraulic medium is released from the collective pressure accumulator into the respective piston-type accumulator during an individual spring travel. This causes the prestress pressure in the pressure accumulator to drop, so that the supplementary spring force on the opposite side of the motor vehicle also decreases. This allows the pneumatic pressure of this opposite piston-type accumulator to displace the hydraulic medium into the corresponding strut via the separating piston such that said strut is expanded and the corresponding side of the motor vehicle is slightly raised.

The characteristics described previously have particularly positive effects on off-road vehicles, e.g., construction vehicles.

For reasons of completeness, it should be mentioned that each pressure medium cylinder may also be constructed as a double-acting cylinder-piston unit with a piston charged with a prestress pressure on both sides and acts upon the respective separating piston rod of the corresponding piston-type accumulator. In this, the pressure chambers of the pressure medium cylinder, which are separated from one another via the piston, may be interconnected in pairs via two connections, each of which is connected with one of two pressure accumulators. This interconnection may be realized as either parallel or crossed. In this, the supplementary spring force results from the sum or difference between two opposing piston forces.

An additional alternative variation of the embodiment described above consists of arranging the struts of the interconnected strut systems on different axles on the same side of the motor vehicle or on different axles on opposite sides of the motor vehicle. In this, a crossed arrangement is also possible, e.g., front/rear or on a double axle. Additional advantageous characteristics of the invention are disclosed in the subclaims as well as the following description.

BRIEF DESCRIPTION OF DRAWINGS

The invention is described in detail below with the aid of several embodiments illustrated in the figures. The figures show:

FIG. 1: a basic circuit diagram of a suspension system according to the invention, whereby each main component is illustrated in a simplified sectional view;

FIG. 2: an enlarged and detailed sectional view of the components within region II in FIG. 1, i.e., two interconnected piston-type accumulators with one collective pressure accumulator;

FIG. 3: an advantageous development of one of the struts illustrated in FIG. 1 within the region of a damping valve;

FIG. 4: a view analogous to FIG. 2, however in the form of a strongly simplified basic representation of an alternative embodiment.

DETAILED DESCRIPTION OF PREFERRED EMBODIMENTS

Figure 5:
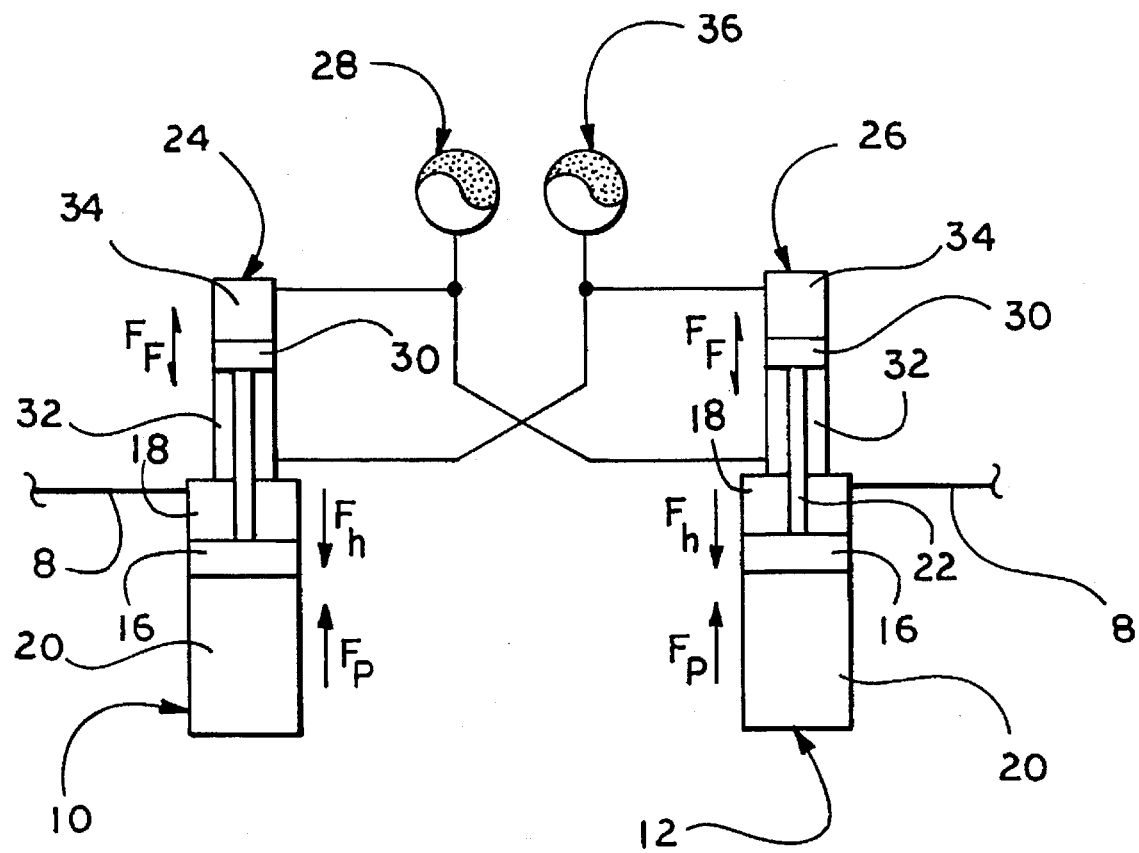
FIG. 5: a view analogous to FIG. 4 of an additional embodiment.

In the various figures, identical components are always identified by identical reference numerals, so that each description of a component, which is only made once, applies analogous to the other respective figures in which this component is also identified by the corresponding reference numeral.

FIG. 1 shows that a suspension system according to the invention comprises at least two strut systems 1,2, which, according to the invention, are interconnected by a special measure. The main components of each strut system 1,2 are a hydraulic strut 4 or 6 and a hydropneumatic piston-type accumulator 10 or 12 which is connected with the aforementioned strut via a hydraulic connection 8.

Each strut 4,6 consists of a cylinder, a piston, which may be moved inside said cylinder, and a piston rod, which is connected with the piston and extends out of the cylinder. The strut 4,6 is arranged between an unsprung mass and a sprung mass in order to support the wheel or axle of a motor vehicle. During the spring deflection, a hydraulic medium is displaced from the strut 4,6, namely into the corresponding piston-type accumulator 10,12, and the hydraulic medium returns correspondingly during the rebound. In this, the spring force is generated by the respective piston-type accumulator 10,12.

FIG. 2 clearly shows that each piston-type accumulator 10,12 comprises a separating piston 16 which floats in a storage cylinder 14, i.e., is guided in a freely movable fashion in said storage cylinder. Inside the storage cylinder 14, each separating piston 16 separates a hydraulic storage volume 18, which is connected with the respective strut 4 or 6 via the hydraulic line 8 from a spring chamber 20 filled with a compressible medium, particularly gas.

The load-dependent hydraulic pressure inside the respective strut 4,6 also acts in the respective storage volume 18 of the corresponding piston-type accumulator 10,12 via the connection 8. The pneumatic pressure adjusts itself at this location by displacing the separating piston 16 correspondingly and compressing the compressible medium in the spring chamber 20. Consequently, the separating piston 16 is charged with the hydraulic pressure on its side facing the storage volume 18, so that hydraulic force $F_h$ is generated with the tendency to displace the separating piston 16 in the direction of the spring chamber 20. However, this is opposed by pneumatic force $F_p$, which is generated by charging the opposite surface of the separating piston 16 with the pneumatic pressure.

In this, it is suggested that the separating piston 16 of each piston-type accumulator 10,12 is charged additionally with a supplementary spring force $F_f$. For this, each separating piston 16 is connected with a separating piston rod 22 that extends out of the storage cylinder 14 in a sealed fashion, whereby a spring element acts upon this separating piston rod 22 in order to generate the supplementary spring force $F_f$.

In the embodiments according to the invention, this spring element for generating the supplementary spring force is constructed as a pressure medium cylinder 24,26 which is connected with a pressure accumulator 28 that generates a prestress pressure $p_v$.

According to the invention, preferably two (respective) strut systems 1,2 are interconnected in pairs by connecting the existing pressure medium cylinders 24,26, each of which charges one of the two piston-type accumulators 10,12 or their separating piston 16 via the corresponding separating piston rod 22, with one another as well as with the same pressure accumulator 28.

In the preferred embodiment illustrated in FIG. 2, the pressure medium cylinders 24,26 are each charged with the prestress pressure $P_v$ in such a way that the supplementary spring $F_F$ of each separating piston 16 acts in the direction of the pneumatic force $F_p$. Consequently, each pressure medium cylinder 24,26 acts as a tension spring such that the separating piston 16 is charged in the direction of the storage volume 18 via the separating piston rod 22 and a forced expansion of the compressible medium results due to the corresponding increase in the volume of the spring chamber 20. This construction is preferably realized by providing each pressure medium cylinder 24,26 with a piston 30, which, in particular, is connected directly with the end of the separating piston rod 22, whereby the annular space 32, which is formed inside the pressure medium cylinder 24,26 on the side of the piston 30 and surrounds the separating piston rod 22, is charged with the prestress pressure $p_v$.

As an alternative to the embodiment illustrated in FIG. 2, it is also possible to charge the pressure medium cylinder 24,26 with the prestress pressure in such a way that the supplementary spring force acts in the opposite direction, i.e., in the direction of the hydraulic force $F_h$. For this, each pressure medium cylinder 24,26 practically acts as a pressure spring, whereby said fact is realized by charging the opposite cylinder space 34 with the prestress pressure instead of the respective annular space 32. Based on the specific illustration in FIG. 2, this may also be realized by removing the piston 30, so that the respective separating piston rod 22 acts as a plunger inside the pressure medium cylinder 24,26.

FIG. 4 illustrates, in a highly schematic fashion, that the pressure accumulator 28 charges the cylinder spaces 34 of both pressure medium cylinders 24,26. This figure additionally shows in broken lines that this may also be realized in-combination with the tension spring variation by connecting the annular spaces 32 with an additional pressure accumulator 36. Consequently, this pertains to a pair- by-pair interconnection of the pressure accumulators 32,34 of both pressure medium cylinders 24,26, namely a parallel circuit.

As an alternative to this, FIG. 5 illustrates that a corresponding interconnection may also be realized as a crossed connection.

In FIG. 4 as well as FIG. 5, the supplementary spring force results from the sum or the difference of two opposing forces which act upon the piston 30.

In this context, we also refer to the initially mentioned application P 42 34 217.1 to its full extent.

For reasons of completeness, it should be mentioned that the scope of the invention also includes an embodiment in which the supplementary spring force $F_F$ of the separating pistons 16 of both piston-type accumulators 10,12 acts in opposite directions. This may be realized by arranging the tension spring variation on one side and the pressure spring variation on the other side.

Several variations also exist for realizing the arrangement of the struts 4,6 of the strut systems 1,2, which are interconnected according to the invention. It is particularly advantageous to arrange the, in particular two, truts 4,6 on the same axle and on opposite sides of the motor vehicle. In addition, it is possible to arrange the struts 4,6 on different axles and on the same side of the motor vehicle, e.g., on the front and the rear axle or on both axles of a double axle. The struts 4,6 may also be arranged on different axles on opposite sides of the motor vehicle, which would practically represent a crossed arrangement.

According to FIG. 2, the pressure accumulator 28 is preferably constructed as a hydropneumatic piston-type accumulator, namely as a pressure transducer with a separating piston rod 40 that extends toward the outside such that the corresponding separating piston 42 has two different pressure surfaces. If an equilibrium of forces is present, this causes the pressure on the side of the separating piston rod 40 to always be higher than the opposite pressure, in particular, the pneumatic pressure.

FIGS. 1 and 3 show that a damping valve 46, particularly a load-dependent and adjustable damping valve, is arranged in the hydraulic connection 8 between each strut 4,6 and the corresponding piston-type accumulator 10,12. According to FIG. 3, each damping valve 46 comprises an adjusting device 48 that can be charged with a load-dependent control pressure via a control valve 50, preferably only for short periods of time. The hydraulic pressure of the corresponding strut or the opposite strut (see FIG. 1) may be used as the control pressure. Consequently, the damping effect may be adapted to the respective static load by capturing the load-dependent pressure inside the adjusting device 48. In this, it is particularly advantageous if the adjusting device 48 of the damping valve 46 is charged continuously by a control pressure accumulator 52, which maintains a minimum control pressure. This results in a very safe arrangement because the control pressure accumulator 52 always adjusts a minimum damping effect via the adjusting device 48. The damping valve 46 preferably only acts in the direction of the deflection of the strut 4,6. For this purpose, a return valve 54 is arranged in parallel with the damping valve 46.

FIG. 1 also shows that each strut 4,6 preferably may be connected selectively with a hydraulic pressure line P or a tank return line T via a leveling device 56. This measure allows the level of the motor vehicle to be adjusted in the static condition.

The suspension system according to the invention insures a very positive suspension and stabilization behavior. This is attained with a relatively small expenditure of specific components, in particular, because a single pressure accumulator suffices for generating the prestress force. A particularly high load ratio may be realized with the preferred embodiment according to FIG. 2. This is the reason why one has to accept the fact that gas seals are necessary for the piston-type accumulators 10,12 because the pneumatic pressure may become higher than the hydraulic pressure during rebound.

I claim:

1. Hydropneumatic suspension system for motor vehicles, comprising at least two strut systems (1,2) each with a hydraulic strut (4,6) which during its deflection and rebound movement acts upon at least one hydropneumatic piston-type accumulator (10,12) via a hydraulic medium, whereby the piston-type accumulator (10,12) is provided with a separating piston (16) which has a separating piston rod (22) that extends out of the piston-type accumulator (10,12) and separates a hydraulic storage volume (18) from a spring chamber (20) containing a compressible medium, and whereby the separating piston (16) is charged with a hydraulic pressure on the side of the storage volume (18) resulting in a force (Fh), a pneumatic pressure on the side of the spring chamber (20) resulting in a force (Fp) and, with a supplementary spring force (FF) via the separating piston rod (22), whereby the supplementary spring force (FF) is generated by a pressure medium cylinder (24,26) that acts upon the separating piston rod (22) by connecting the pressure medium cylinder (24,26) with at least one pressure accumulator (28,36) which generates a prestress pressure (pv), characterized by the fact that said at least two strut systems (1,2) are interconnected by connecting their said pressure medium cylinders (24,26) with at least one .

2. Suspension system according to claim 1, characterized by the fact that the pressure medium cylinders (24,26) are charged with said prestress pressure in such a way that the supplementary spring force ($F_F$) of each separating piston (16) acts in the direction of the force ($F_p$) resulting from the pneumatic pressure.

3. Suspension system according to claim 1, characterized by the fact that the pressure medium cylinders (24,26) are charged with the prestress pressure (pv) in such a way that the supplementary spring force (FF) of each said separating piston (16) acts in the direction of the force (Fh) resulting from the hydraulic pressure.

4. Suspension system according to claim 1, characterized by the fact that the pressure medium cylinders (24,26) are charged with the prestress pressure ($P_v$) in such a way that the supplementary spring force ($F_F$) of the separating piston (16) acts in opposite directions.

5. Suspension system according to claim 1, characterized by the fact that each pressure medium cylinder (24,26) is constructed as a double-acting cylinder/piston unit with a piston (30) which may be charged with the prestress pressure (pv) on both sides and acts upon the respective separating piston rod (22) of the corresponding piston-type accumulator (10,12).

6. Suspension system according to claim 5, characterized by the fact that pressure chambers (32,34) of the pressure medium cylinders (24,26), which are separated from one another by the piston (30), are interconnected in pairs via one of the two pressure accumulators (28, 36).

7. Suspension system according to claim 1, characterized by the fact that the struts (4,6) of the interconnected strut systems (1,2) are arranged on an axle and on opposite sides of the motor vehicle.

8. Suspension system according to claim 1, characterized by the fact that the struts (4,6) of the interconnected strut systems (1,2) are arranged on different axles and on the same side of the motor vehicle.

9. Suspension system according to claim 1, characterized by the fact that the struts (4,6) of the interconnected strut systems (1,2) are arranged on different axles and on opposite sides of the motor vehicle.

10. Suspension system according to claim 1, characterized by the fact that each said pressure accumulator (28,36) is constructed as a hydropneumatic piston-type accumulator.

11. Suspension system according to claim 1, characterized by the fact that a load-dependent and adjustable damping valve, (46) is arranged in a hydraulic connection (8) between each strut (4,6) and a corresponding one of said piston-type accumulators (10,12).

12. Suspension system according to claim 11, characterized by the fact that each damping valve (46) comprises an adjusting device (48), which may be charged with a load-dependent control pressure via a switching valve (50), preferably for only short periods of time.

13. Suspension system according to claim 12, characterized by the fact that the adjusting device (48) of said each damping valve (46) is charged continuously by a control pressure accumulator (52), which maintains a minimum control pressure.

14. Suspension system according to claim 1, characterized by the fact that each strut (4,6) may be connected selectively with a hydraulic pressure line (P) or a tank return line (T) via a leveling device (56).

\* \* \* \* \*

UNITED STATES PATENT AND TRADEMARK OFFICE
CERTIFICATE OF CORRECTION

PATENT NO. : 5,547,211
DATED : August 20, 1996
INVENTOR(S) : Walter L. Runkel

It is certified that error appears in the above-identified patent and that said Letters Patent is hereby corrected as shown below:

Column 6, line 61, insert
      -- said pressure accumulators (28/36) --
      after "one".

Signed and Sealed this

Fifth Day of November, 1996

Attest:

BRUCE LEHMAN

*Attesting Officer*      *Commissioner of Patents and Trademarks*